(12) United States Patent
Shiah (10) Patent No.: US 11,789,893 B2
(45) Date of Patent: Oct. 17, 2023

(54) MEMORY SYSTEM, MEMORY CONTROLLER AND MEMORY CHIP

(71) Applicant: ETRON TECHNOLOGY, INC., Hsinchu (TW)

(72) Inventor: Chun Shiah, Hsinchu (TW)

(73) Assignee: ETRON TECHNOLOGY, INC., Hsinchu (TW)

( * ) Notice: Subject to any disclaimer, the term of this patent is extended or adjusted under 35 U.S.C. 154(b) by 0 days.

(21) Appl. No.: 17/391,755

(22) Filed: Aug. 2, 2021

(65) Prior Publication Data
US 2022/0156223 A1 May 19, 2022

Related U.S. Application Data

(60) Provisional application No. 63/061,194, filed on Aug. 5, 2020.

(51) Int. Cl.
 *G06F 13/42* (2006.01)
 *G06F 13/16* (2006.01)

(52) U.S. Cl.
 CPC ...... *G06F 13/4291* (2013.01); *G06F 13/1678* (2013.01); *G06F 13/1689* (2013.01); *G06F 13/423* (2013.01)

(58) Field of Classification Search
 CPC ............. G06F 13/4291; G06F 13/1678; G06F 13/1689; G06F 13/423
 See application file for complete search history.

(56) References Cited

U.S. PATENT DOCUMENTS

| | | | | |
|---|---|---|---|---|
| 2010/0014364 A1* | 1/2010 | Laberge | ............... | G11C 7/1006 365/189.011 |
| 2012/0023383 A1* | 1/2012 | Maehata | ............ | H03M 13/1145 714/752 |
| 2015/0317277 A1* | 11/2015 | Wang | ........................ | G06F 1/10 710/313 |
| 2017/0160928 A1* | 6/2017 | Jaffari | ................... | G06F 3/0658 |
| 2017/0262367 A1* | 9/2017 | Chun | ................... | G11C 7/1075 |
| 2017/0364469 A1* | 12/2017 | Crisp | .................. | G06F 13/4282 |
| 2021/0042245 A1* | 2/2021 | Betser | ................. | G06F 13/4234 |

* cited by examiner

*Primary Examiner* — Phong H Dang
(74) *Attorney, Agent, or Firm* — Birch, Stewart, Kolasch & Birch, LLP (57) ABSTRACT

A memory system comprises a memory and a physical layer circuit. The memory system comprises a memory, a data bus and a single-pin STB. The memory receives a parallel command though the data bus, and receives a serial command through the STB. The physical layer circuit is configured to transmit the parallel command to the data bus. The physical layer circuit is configured to convert STB input data from the controller into the serial command and transmit the serial command to the STB.

12 Claims, 12 Drawing Sheets

| Data Bus 510 | pattern buffer | activate | read | write | pecharge |
|---|---|---|---|---|---|
| Bit 0 | 0r, 0f | 0, 0 | 1, 0 | 0, 0 | 1, 0 | 0, 0 |
| Bit 1 | 1r, 1f | 1, X | 0, Raddr | 0, X | 0, X | 0, X |
| Bit 2 | 2r, 2f | 0, X | 1, Raddr | 0, X | 0, X | 1, X |
| Bit 3 | 3r, 3f | CL, X | BkAdd, Raddr | BkAdd, X | BkAdd, X | X |
| Bit 4 | 4r, 4f | CL, X | BkAdd, Raddr | BkAdd, X | BkAdd, X | X |
| Bit 5~15 | 56789...15 | CL, nWR, Zout, ODT | Raddr | BC, Caddr | BC, Caddr | Bkn |

FIG. 4

| Bit | read/write | activate | reset |
|---|---|---|---|
| 0 (t0) | 0 | 1 | 0 |
| 1 (t1) | 1 | 0 | 0 |
| 2 (t2) | Bk Add | Bk Add | 0 |
| 3 (t3) | Bk Add | Bk Add | 0 |
| 4 (t4) | read/write | Raddr | 0 |
| 5 (t5) | Caddr | Raddr | 0 |
| 6789...15 | Caddr x 10 | Raddr x 10 | 0 |

Bit 0
Bit 1
Bit 2
Bit 3
Bit 4
Bit 5
Bit 6~15

MEMORY SYSTEM, MEMORY CONTROLLER AND MEMORY CHIP

CROSS REFERENCE TO RELATED APPLICATIONS

This application claims the benefit of U.S. Provisional Application No. 63/061,194, filed on Aug. 5, 2020 and entitled "Parallel STB Buses to A Single STB Bus Design", the contents of which are incorporated herein by reference.

BACKGROUND OF THE INVENTION

1. Field of the Invention

The present invention relates to a memory system and a memory chip, and particularly to a memory system and a memory chip that can let data be transmitted between a logic circuit and the memory chip in parallel.

2. Description of the Prior Art

Nowadays, a memory system for high performance computing or artificial intelligence (AI) system usually includes dynamic random access memory (DRAM) chips and a logic circuit. Due to stacked structures of the DRAM chips, scaling of the DRAM chips cannot follow scaling of the logic circuit. Therefore, a memory-wall effect occurs to result in data transmission rates between the logic circuit and the DRAM chips being reduced. To overcome the memory-wall effect, the prior art usually utilizes faster data rate (e.g., from DDR3 to DDR4 or DDR5) to transmit data between the DRAM chips and the logic circuit, or utilizes wide data bus of the logic circuit and wide data bus of the DRAM chips (e.g. HBM) to transmit data between the DRAM chips and the logic circuit. However, the faster data rate has disadvantages (e.g. more expensive tester, less noise margin, and so on), and the wide data bus of the logic circuit and the wide data bus of the DRAM chips also have disadvantages (e.g. higher power, larger die area, and expensive Through-Silicon Via ("TSV") process, and so on).

A bus is often used to interconnect a controller IC to one or more memory ICs. The controller IC may perform other tasks related to the system operation such as video processing, programmable logic, or other functions and is not limited to memory interfacing alone. The memory technology determines in part requirements for the protocol used by a bus connected to a memory. At the same time, bus protocol and physical properties establish the bandwidth and function.

Figure 1:
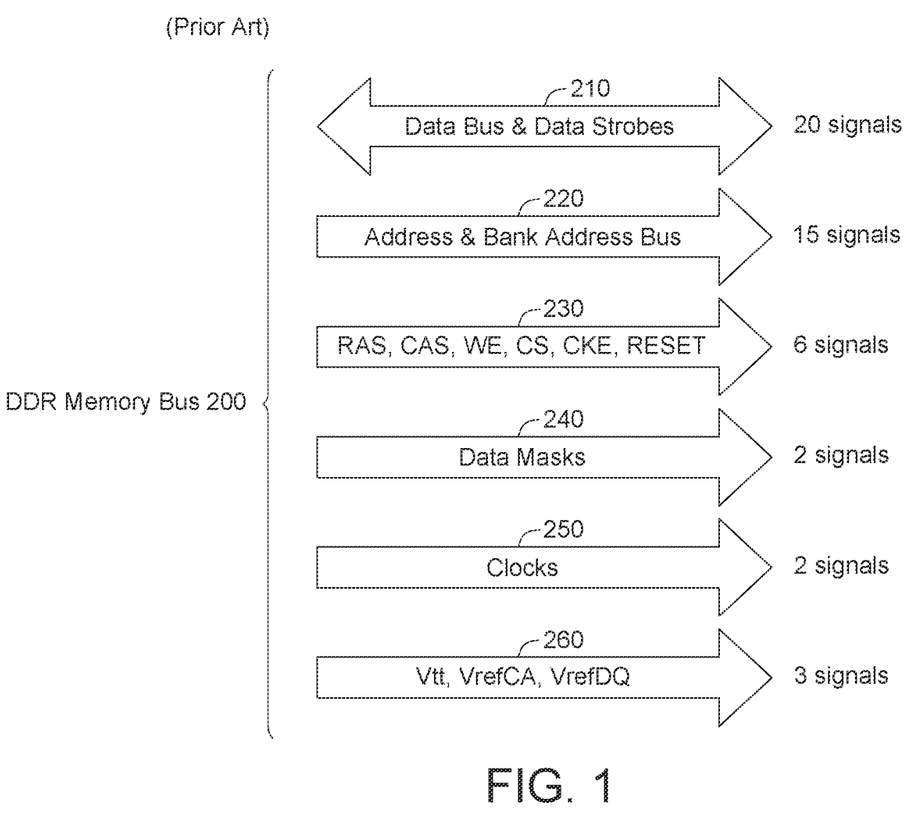
FIG. 1 is a diagram illustrating DDR3 DRAM as disclosed in the prior art.

Because memory ICs commonly support broad applications they usually incorporate tens of signals for electrical connection to the controller ICs to expose and access all of the memory IC functions. Please refer to FIG. 1 which illustrates a conventional DDR3 type memory bus used for interconnecting a DDR3 DRAM to a controller. The DDR3 DRAM bus 200 has clock signals, data signals, address signals, bank address signals, command signals, strobe signals, reference voltage signals, termination voltages and so on that comprise the DDR3 memory bus. A total of more than 45 signals are used with the DDR3 bus. Therefore, each DDR3 DRAM will require 45 signal pins, which will result in increased package cost and layout complexity. As a consequence it is desirable to reduce the number of signals required to connect to a memory IC for many types of applications, i.e., those that do not require large capacity memory systems. However, if reducing the number of signal pins means reducing the bus width, the memory interface circuit on the controller IC requires less silicon area in the case of fewer bus signals. While a small number of signals also makes it easier to keep the signals together in a small region on the floor plan of the controller IC, which can offer IC layout benefits. Also, fewer signals mean there are fewer connections to interconnect the memory and controller ICs. As the number of signals is reduced, the maximum bandwidth of the bus is also reduced. And, for a given switch speed, fewer switch signals are used to transfer information. Therefore, how to reduce signal pins of memory chips or bus width, and maintain a certain transmission rate and numbers of signals at the same time, is an important problem for memory system designers to solve.

SUMMARY OF THE INVENTION

An embodiment of the present invention provides a memory system which comprises a memory and a physical layer circuit. The memory comprises a data bus configured to receive a parallel command, and a serial bus configured to receive a serial command. The physical layer circuit is configured to transmit the parallel command to the data bus. The physical layer circuit is configured to convert an input data into the serial command and transmit the serial command to the serial bus.

According to another aspect of the invention, the memory has less than 45 signal pins, the data bus has 16 signal pins, and the serial bus is a single strobe pin; wherein the parallel command is 16 bit wide and the serial command is 16 bit long. According to another aspect of the invention, the memory receives both the parallel command and the serial command.

According to another aspect of the invention, the parallel command comprises a first command signal and a first address signal, and the serial command comprises a second command signal and a second address signal. Based on the parallel command received from the data bus, the memory outputs a first data corresponding to the first address signal from the data bus after a first predetermined time. Based on the serial command received from the serial bus, the memory outputs a second data corresponding to the second address signal from the data bus after as a second predetermined time.

According to another aspect of the invention, the physical layer circuit comprises an adaptive conversion circuit and a set of clock signals. The adaptive conversion circuit converts the input data into the 16-bit long serial command based on the set of clock signals.

According to another aspect of the invention, the input data comprises two sets of 8-bit wide parallel data, and the set of clock signals comprises a clock 1 signal, a clock 2 signal and a clock 3 signal; wherein the period of the clock 2 signal is twice the period of the clock 3 signal, and the period of the clock 1 signal is twice the period of the clock 2 signal; wherein the adaptive conversion circuit converts the two sets of 8-bit wide parallel data into the 16-bit long serial command based on the clock 1 signal, the clock 2 signal and the clock 3 signal in 8 cycles of the clock 3 signal.

According to another aspect of the invention, the input data comprises 4 sets of 4-bit wide parallel data, and the set of clock signals comprises a clock 2 signal and a clock 3 signal; wherein the period of the clock 2 signal is twice the period of the clock 3 signal; wherein the adaptive conversion circuit converts the 4 sets of 4-bit wide parallel data into the 16-bit long serial command based on the clock 2 signal and the clock 3 signal in 8 cycles of the clock 3 signal.

According to another aspect of the invention, wherein the input data comprises 8 sets of 2-bit wide parallel data, and the set of clock signals comprises a clock 3 signal; wherein the adaptive conversion circuit converts the 8 sets of 2-bit wide parallel data into the 16-bit long serial command based on the clock 3 signal in 8 cycles of the clock 3 signal.

According to another aspect of the invention, the input data comprises one set of 16-bit wide parallel data, and the set of clock signals comprises a clock 0 signal, a clock 1 signal, a clock 2 signal and a clock 3 signal; wherein the period of the clock 2 signal is twice the period of the clock 3 signal, the period of the clock 1 signal is twice the period of the clock 2 signal, and the period of the clock 0 signal is twice the period of the clock 1 signal; wherein the adaptive conversion circuit converts the one set of 16-bit wide parallel data into the 16-bit long serial command based on the clock 0 signal, the clock 1 signal, the clock 2 signal and the clock 3 signal in 8 cycles of the clock 3 signal.

According to another aspect of the invention, the memory system further comprises a controller providing the input data to the physical layer circuit. The input data may be one set of 16-bit wide parallel data, two sets of 8-bit wide parallel data, 4 sets of 4-bit wide parallel data, or 8 sets of 2-bit wide parallel data, wherein the memory comprises a clock signal, and the adaptive conversion circuit converts the one set of 16-bit wide parallel data, two sets of 8-bit wide parallel data, 4 sets of 4-bit wide parallel data, or 8 sets of 2-bit wide parallel data into the 16-bit long serial command.

According to another aspect of the invention, the physical layer circuit transmits the parallel command to the data bus which is a 16-bit wide DQ bus and the physical layer circuit transmits the serial command to the serial bus which is a 1-bit wide STB bus. Moreover, the 16-bit wide DQ bus is separated from the 1-bit wide STB bus.

Thus, compared to the prior art, the memory system of the present invention can not only reduce the width of the bus connected to the memory chip, but can also use parallel and serial transmission command signals/address signals between the controller IC and the memory chip to increase the transmission rate and number of signals

DETAILED DESCRIPTION

Figure 2:
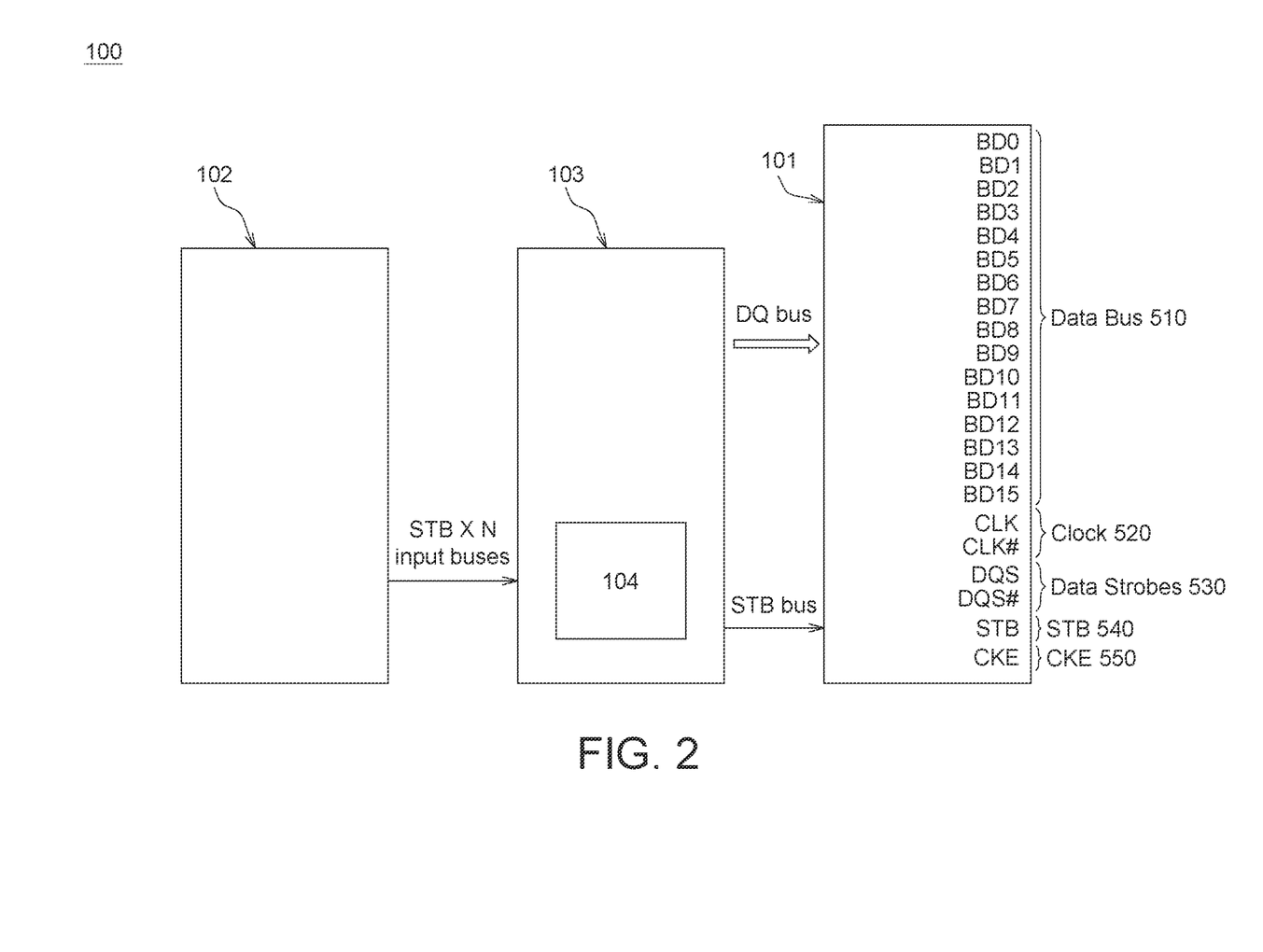
FIG. 2 is a diagram illustrating the storage system of the present invention.

Referring to FIG. 2, FIG. 2 is a diagram illustrating a storage system 100 disclosed in a first embodiment of the present invention. As shown in FIG. 2, the memory system 100 includes a memory circuit 101, a controller IC 102, and a physical layer circuit 103. The controller IC 102 may be coupled to other devices or processors via an Advanced eXtensible Interface (AXI) bus. The AXI bus includes a write data bus and a read data bus. The physical layer circuit 103 is electrically connected to the controller IC 102, and the physical layer circuit 103 is also electrically connected to the memory circuit 101. The command signals from the controller IC 102, for example, are converted into a transmission format that conforms to the bus of the memory circuit 101 through the physical layer circuit 103, and then are transmitted to the memory circuit 101 for execution.

In this embodiment of present invention, buses of the memory circuit 101 include the Data Bus 510, Clocks 520, Data Strobes 530, Strobe (STB) 540 and Clock Enable (CKE) 550. These signals comprise the high speed switching signals used in the memory circuit 101. The memory circuit 101 is internally organized into one or more memory banks, and the memory circuit 101 receives memory bank, row and column addresses to specify a given group of words to be accessed. Before a memory bank is available for data storage and retrieval, it is first pre-charged and then activated. "Activate" means decode a specific word line in the memory bank.

Furthermore, the memory circuit 101 receive address and control commands from the physical layer circuit 103 through Data Bus 510 (16 pins in the embodiment, but not limited to this) and Data Strobes 540 (single pin) by using different protocols. The physical layer circuit 103 provides address and control commands to the memory circuit 101 by using packets. The packets may be provided through the Data Bus 510 by using a parallel protocol or through the STB 540 by using a serial protocol.

Thus, the Data Bus 510 not only transmits general parallel data (16 bits) in parallel, but provides address and control commands in parallel. Therefore, the Data Bus 510 can receive address/control information from the physical layer circuit 103 and also receive parallel data from the physical layer circuit 103. By multiplexing address and control information onto the Data Bus 510, a large number of memory circuit 101 pins can be eliminated. As a result, the memory circuit 101 can have fewer than 45 signal pins. The method can significantly reduce the number of memory controller IC signals connected to the memory to save memory controller IC chip area, cost, and power.

On the other hand, because address/control information and parallel data (16 bits) are multiplexed to the Data Bus 510, the data bus 510 needs to be time-sharing so that address/control commands, and data information can be transmitted via time-sharing. Since parallel data cannot be transmitted during the transmission of the address/control command, the efficiency of the Data Bus 510 will be reduced. Therefore, through the physical layer circuit 103 and via the STB 540, address and control commands are provided to the memory circuit 101 by using the serial protocol (16 pins in the embodiment, but not limited to this). The Data Bus 510 can transmit parallel data (16 bits) simultaneously to improve the efficiency of the Data Bus 510. Because the STB 540 is a single pin, the physical layer circuit 103 needs to convert the address and control commands from the controller IC 102 into serial packets, which are sequentially received by the STB 540 and then executed by memory circuit 101.

Figure 3:
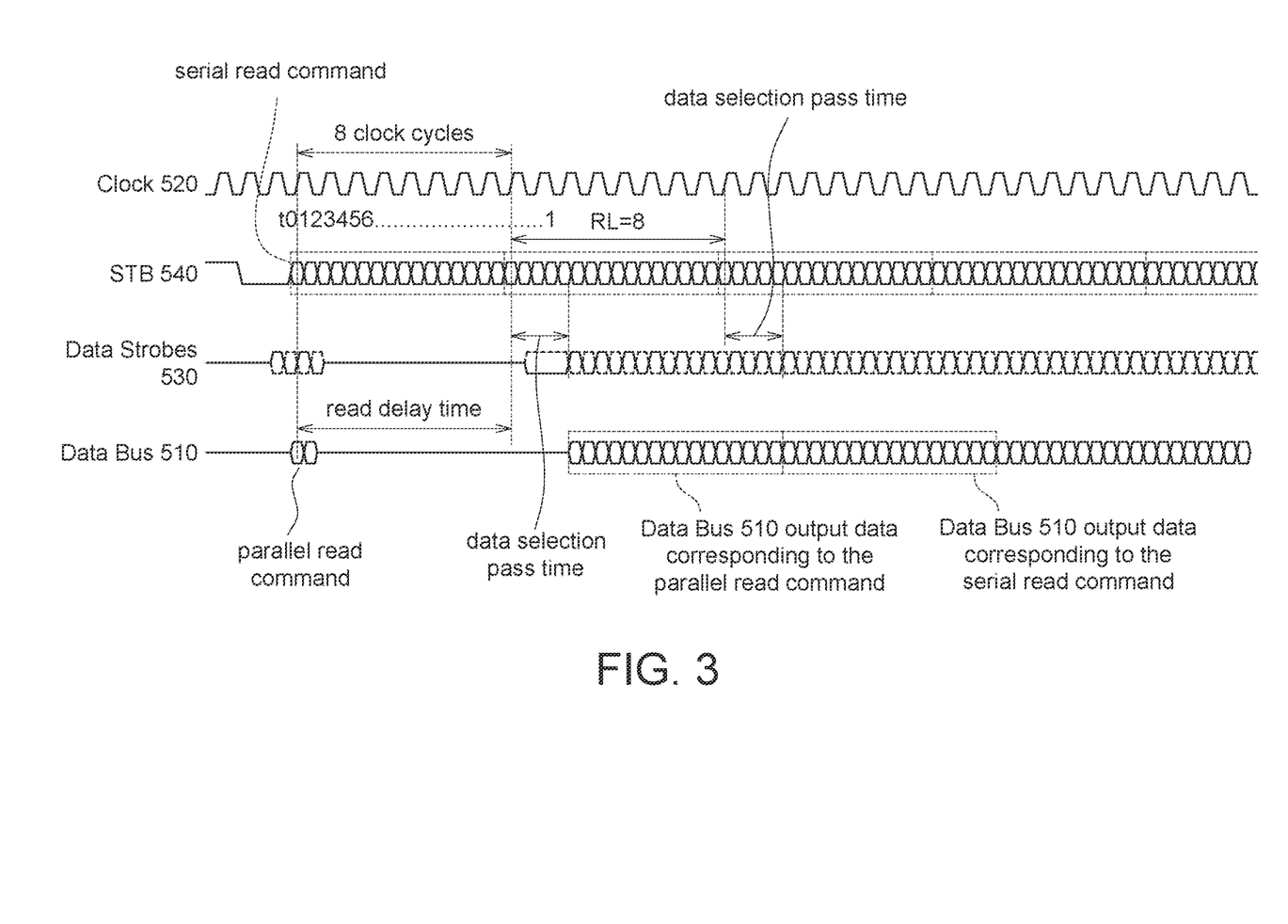
FIG. 3 is a diagram illustrating timing in the first embodiment of the present invention.

Referring to FIG. 3, FIG. 3 is a timing diagram regarding the memory system in FIG. 2. The physical layer circuit 103 can provide the parallel read command (including the address, 16 parallel bits in total) to the memory circuit 101 through the Data Bus 510 in FIG. 2. When the memory circuit 101 receives the parallel read command, after 8 clock cycles of read latency ((RL)=8 clocks) and 2 clock cycles of the termination data strobe tDQS (or data selection pass time), the Data Bus 510 outputs the data corresponding to the parallel read command (either one 16-bit parallel data, or continuous multiple 16-bit parallel data). Of course, the period of the RL and tDQS are not limited to the embodiment, and can be changed by setting the Mode Register.

Figure 4:
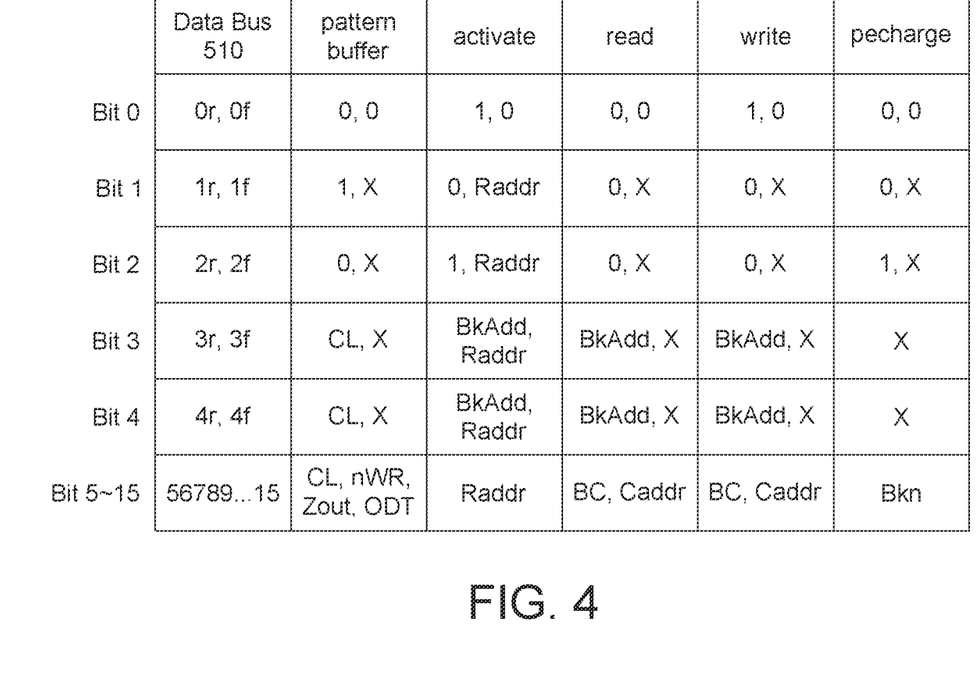
FIG. 4 is a diagram illustrating a table of parallel command lines in an embodiment of the present invention.

Of course, the physical layer circuit 103 can provide different parallel commands to the memory circuit 101 through the Data Bus 510. FIG. 4 shows some of the parallel command lines (including common commands of memory such as pattern buffer write, activate command, read command, write command, precharge command, etc.) of the memory circuit 101. In the embodiment, the Data Bus 510 has 16 bits, and different combinations of 16 bits correspond to different parallel commands. As shown in FIG. 4, "0r" represents the result of rise sampling of the 0th bit, "0f" represents the result of fall sampling of the 0th bit, and so on. "Caddr" represents the column address, "Raddr" represents the row address, and the "Bkadd" represents the bank address of the memory. And others, such as ODT, CL, etc., can be referred to JEDEC, the general standard of the memory industry, and will not be repeated here.

To improve the efficiency of the Data Bus 510 in the embodiment, the physical layer circuit 103 can provide serial read commands (including addresses, 16 serial bits in total) to the memory circuit 101 through the STB bus and the STB 540 shown in FIG. 2. Since STB 510 is one single pin, the physical layer circuit 103 continuously provides 16-bit serial data to STB 540 in 8 clock cycles.

In FIG. 3 when the memory circuit 101 receives the serial read command from the STB pin 540, after 8 clock cycles of read latency ((RL)=8 clocks) and 2 clock cycles of the termination data strobe tDQS (or data selection pass time), the Data Bus 510 outputs the data corresponding to the serial read command (either one 16-bit parallel data, or continuous multiple 16-bit parallel data). In one embodiment, the date bus 510 or DQ bus is 16 bit wide, the STB bus 540 is 1 bit wide, and the DQ bus is separated from the STB bus.

Figure 5:
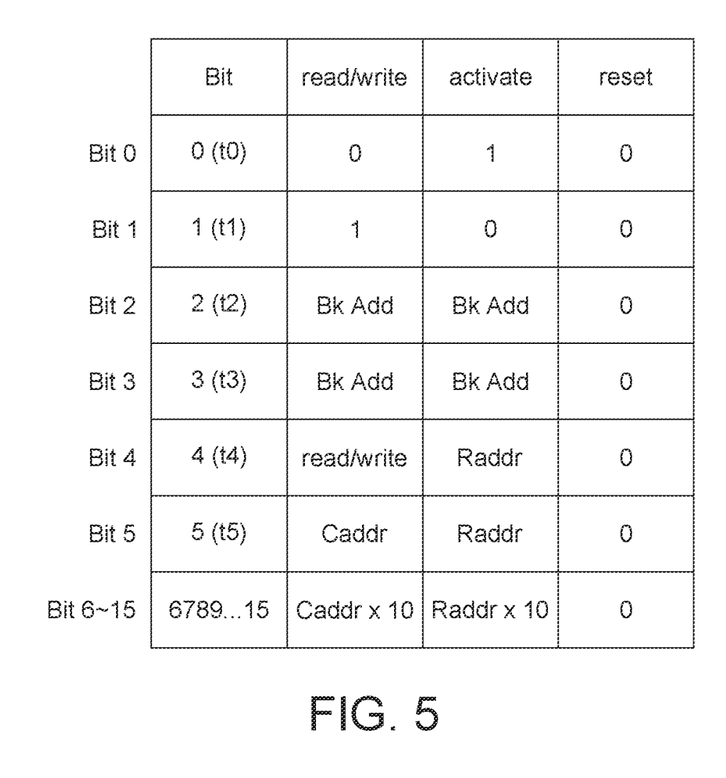
FIG. 5 is a diagram illustrating a table of serial command lines in an embodiment of the present invention.

FIG. 5 shows some of the serial command lines (including common commands of memory such as activate command, read command, write command, reset command, etc.) of the memory circuit 101. In the embodiment, the width of a serial command has 16 bits, and different combinations of 16 bits correspond to different serial commands. As shown in FIG. 5, "Caddr" represents the column address, "Raddr" represents the row address, and the "Bkadd" represents the bank address of the memory.

As shown in FIG. 3, the physical layer circuit 103 can simultaneously provide serial commands and parallel commands to the memory circuit 101 through the Data Bus 510 and the STB 540. Of course, the serial commands and the parallel commands may be provided in different times, for example, one to more clock cycles apart, such as 2 or 3 clock cycles, etc.

However, referring to FIG. 2 again, the STB data width provided by the controller IC 102 to the physical layer circuit 103 (i.e. the width connected to the physical layer circuit 103 through STBxN input bus can be 2 bits, 4 bits, 8 bits, 16 bits, etc.) is typically greater than the STB data width provided by the physical layer circuit 103 to memory circuit 101 (i.e. the width of the STB 540 connected to the memory circuit 101 through STB bus is 1 bit). Therefore, the physical layer circuit 103 of the present invention includes an adaptive conversion circuit 104 that converts the set or sets of STB data provided by the controller IC 102 to the physical layer circuit 103 into a serial 16-bit data in a fixed number of clock cycles (e.g., 8 clock cycles) according to the different STB data widths provided by the controller IC 102 to the physical layer circuit 103.

Figure 6:
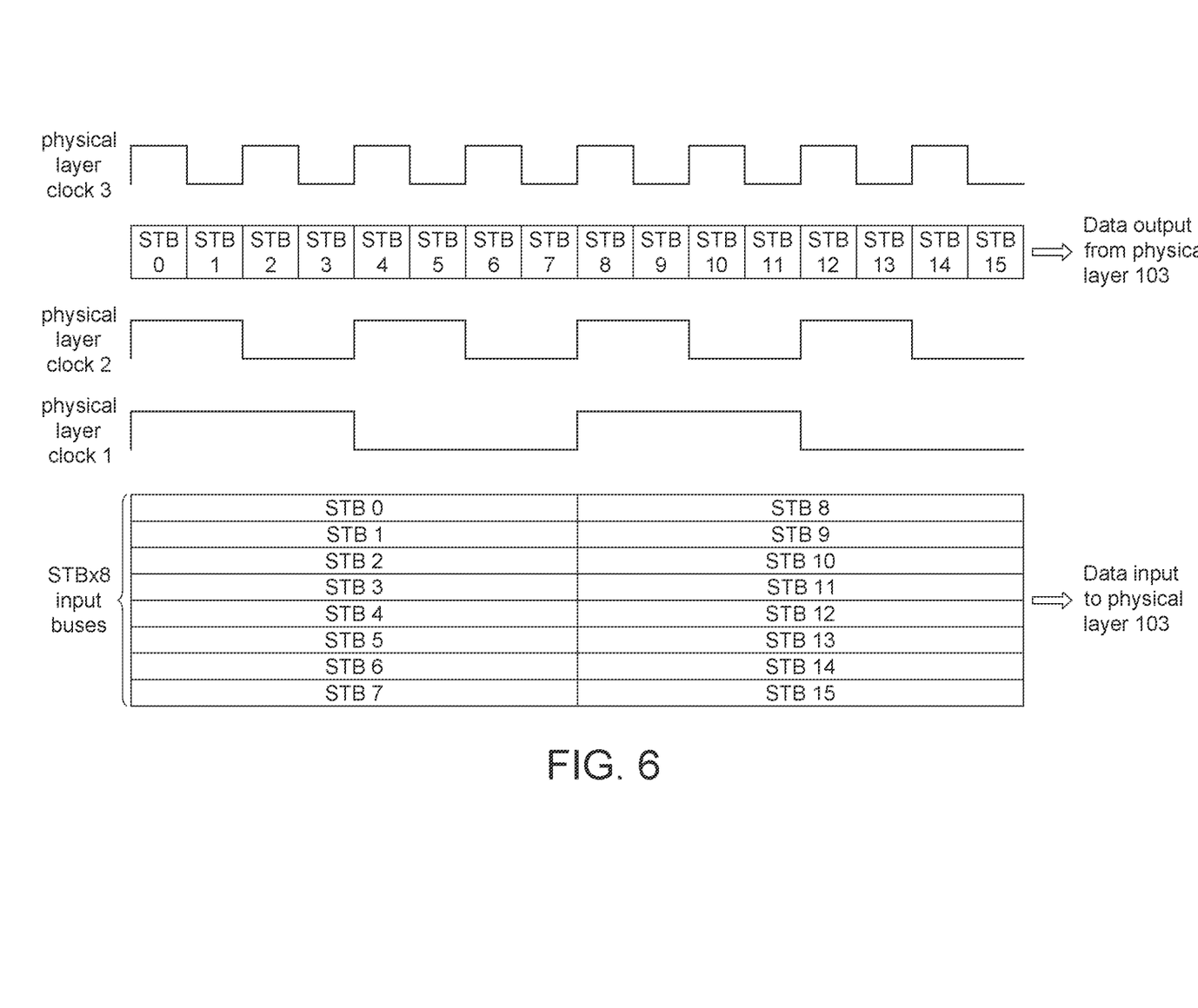
FIG. 6 is a diagram illustrating an embodiment of the present invention when the STB data width provided by controller IC 102 to physical layer circuit 103 is 8 bits.

Referring to FIG. 6, the STB data width provided by controller IC 102 to physical layer circuit 103 in one embodiment of the present invention is 8 bits, i.e. the STBxN input bus between them is the STBx8 input bus. This means that a set of 8-bit parallel STB data is provided from the controller IC 102 to physical layer circuit 103 at once time, but one serial read command provided by physical layer circuit 103 to memory circuit 101 contains 16 serial bits. Therefore, the controller IC 102 will provide the physical layer circuit 103 with two consecutive sets (the total of 16 bits) of parallel STB data (i.e. the first set of STB0-STB7 and the second set of STB8-STB15 in FIG. 6). The physical layer circuit 103 could use three physical layer clocks (physical layer clock 1, physical layer clock 2, and physical layer clock 3) to transform the two consecutive sets (the total of 16 bits) of parallel STB data into a serial 16-bit command in eight cycles of the physical layer clock 3. And the serial 16-bit command is transmitted to the memory circuit 101 through the STB 510 in FIG. 2. In one embodiment, the physical layer clock 3 is equal to the clock 520 of the memory circuit 101.

Figure 7:
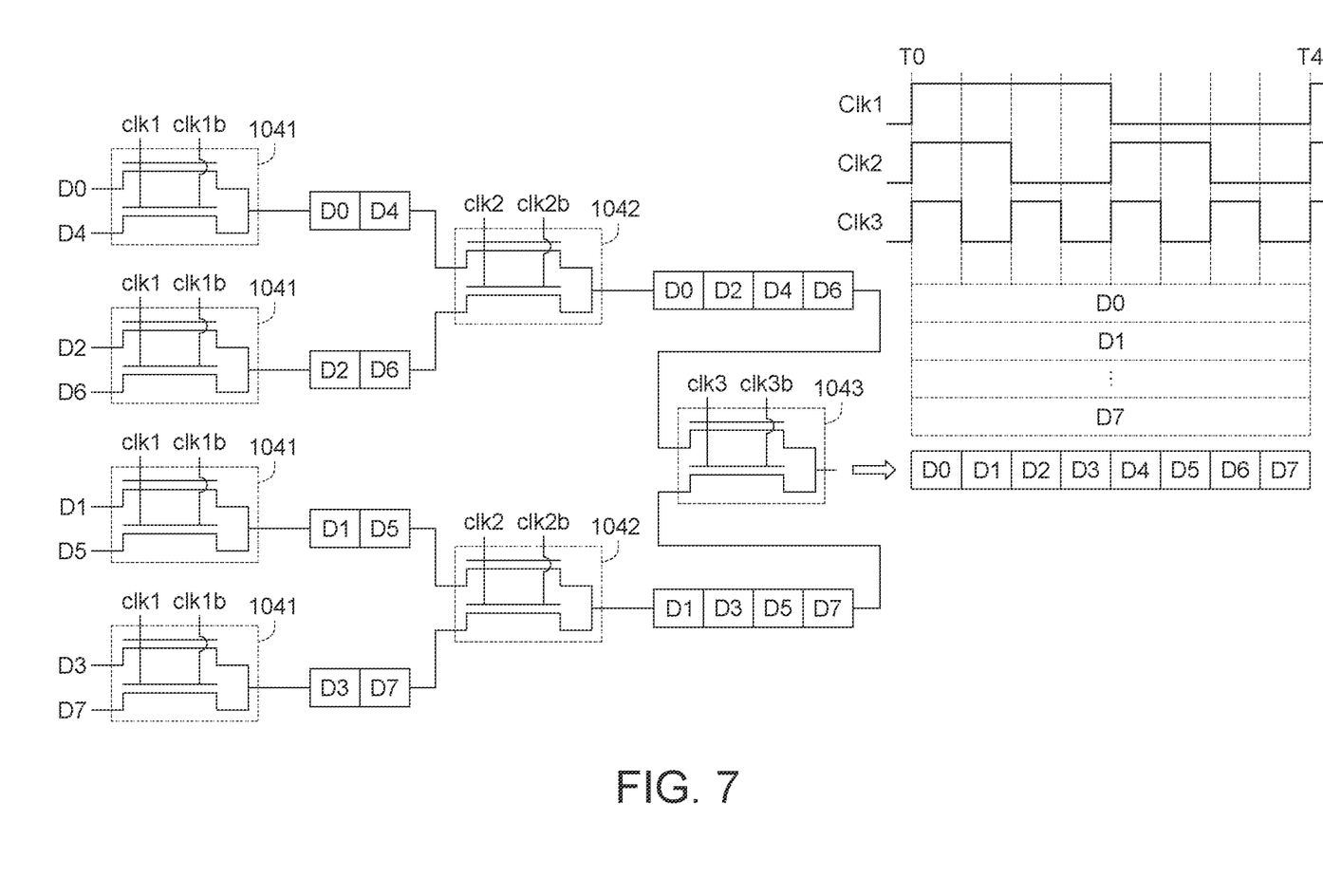
FIG. 7 is a diagram illustrating the adaptive conversion circuit 104 in the physical layer circuit 103 corresponding to the embodiment of FIG. 6.

FIG. 7 is a diagram illustrating the adaptive conversion circuit 104 corresponding to the embodiment of FIG. 6. As shown in FIG. 7, D0-D7=STB 0-STB7. A clock Clk3 corresponds to the physical layer clock 3, a clock Clk3b corresponds to the inverse signal of the physical layer clock 3, a clock Clk2 corresponds to the physical layer clock 2, a clock Clk2b corresponds to the inverse signal of the physical layer clock 2, a clock Clk1 corresponds to the physical layer clock 1, and a clock Clk1b corresponds to the inverse signal of the physical layer clock 1. The period of the physical layer clock 2 is twice the period of physical layer clock 3, and the period of the physical layer clock 1 is twice the period of physical layer clock 2. The adaptive conversion circuit 104 is a three-level circuits which includes four sets of first switch circuits 1041, two sets of second switch circuits 1042, and one set of third switch circuits 1043. The first switch circuit 1041 receives the clock Clk1 and the clock Clk1b, the second switch circuit 1042 receives the clock Clk2 and the clock Clk2b, and the third switch circuit 1043 receives the clock Clk3 and the clock Clk3b.

As shown in FIG. 7, the four sets of the first switch circuits 1041 receive signals D0 and D4, signals D2 and D6, signals D1 and D5, and signals D3 and D7, respectively. First, the clock Clk1 is in a high potential state and the clock Clk1b is in a low potential state. Therefore, the signals D0, D2, D1, and D3 are coupled to the two sets of the second switch circuits 1042. Then, the clock Clk1 is in a low potential state and the clock Clk1b is in a high potential state. Therefore, the signals D4, D6, D5, and D7 are coupled to the two sets of the second switch circuits 1042. The second switch circuit 1042 shown in the top of FIG. 7 receives signals D0 and D2, and signals D4 and D6 respectively, and outputs the signals D0, D2, D4 and D6 to the third switch circuit 1043 in order according to the clock Clk2 clock and the clock Clk2b. The second switch circuit 1042 shown in the lower portion of FIG. 7 receives signals D1 and D3, and signals D5 and D7 respectively, and outputs the signals D1, D3, D5 and D7 to the third switch circuit 1043 in order according to the clock Clk2 clock and the clock Clk2b. Then, the third switch circuit 1043 outputs the signals D0, D1, D2, D3, D4, D5, D6, and D7 in order according to the clock Clk3 and the clock Clk3b. The adaptive conversion circuit 104 can convert an 8-bit parallel data STB0-7 to a serial 8-bit data STB0-7 in 4 cycles of the clock Clk3 (or 4 cycles of the physical layer clock 3) and transmit it to the STB bus and the STB 540 of the memory circuit 101. Furthermore, after 4 cycles of the clock Clk3, another 8-bit parallel data STB8-15 are converted to a serial 8-bit data STB8-15. Therefore, in 8 cycles of the clock Clk3, the adaptive conversion circuit 104 can convert two sets of parallel data STB0-7 and STB8-15 data into one serial 16-bit data STB0-15.

Figure 8:
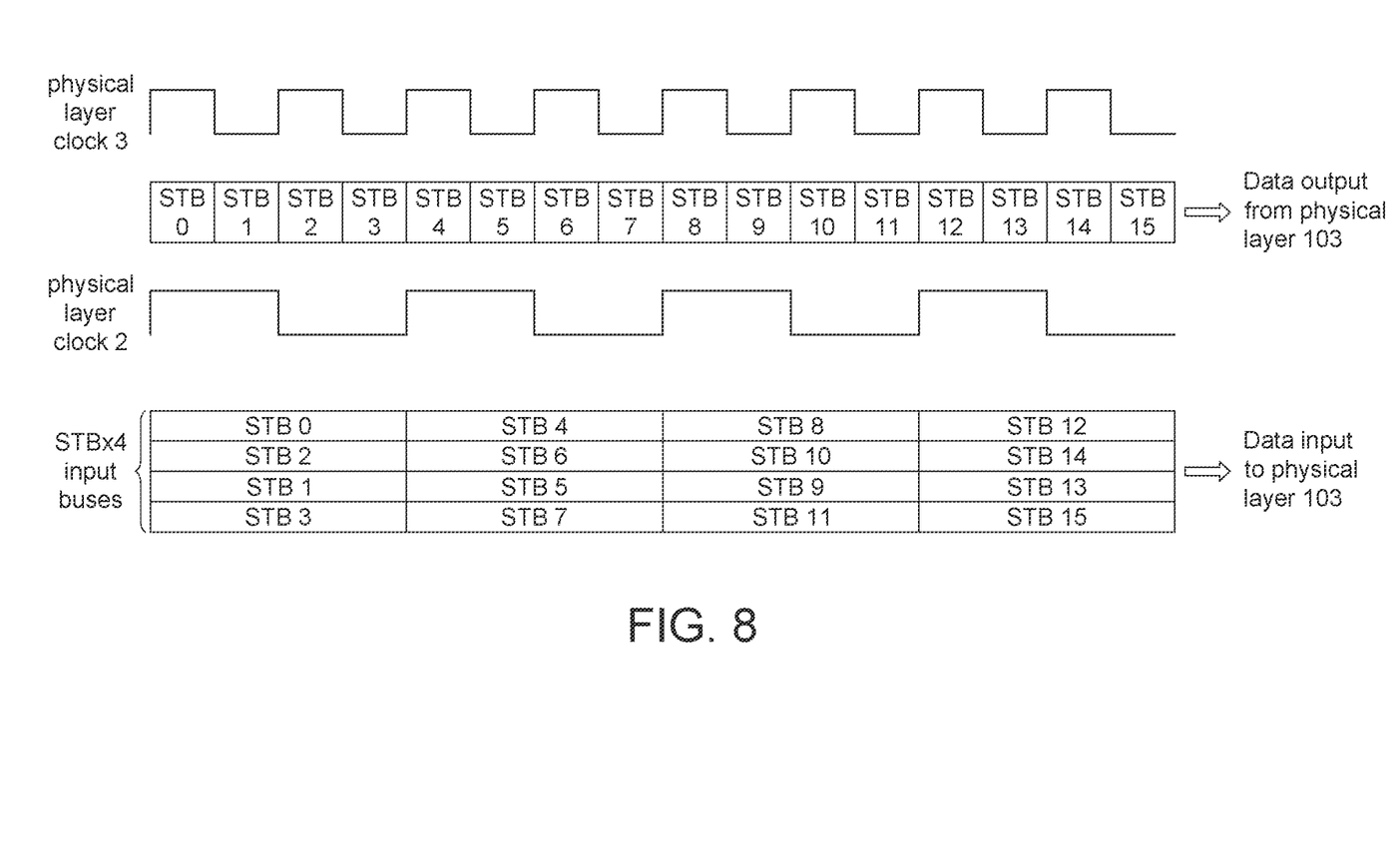
FIG. 8 is a diagram illustrating an embodiment of the present invention when the STB data width provided by controller IC 102 to physical layer circuit 103 is 4 bits.

Referring to FIG. 8, the STB data width provided by controller IC 102 to physical layer circuit 103 in another embodiment of the present invention is 4 bits, i.e. the STBxN input bus between them is the STBx4 input bus. This means that a set of 4-bit parallel STB data is provided by the controller IC 102 to physical layer circuit 103 at once time, but one serial read command provided by physical layer circuit 103 to memory circuit 101 contains 16 bits. Therefore, the controller IC 102 will provide the physical layer circuit 103 with four consecutive sets (total of 16 bits) of parallel STB data (i.e. the first set of STB0-STB3, the second set of STB4-STB7, the third set of STB7-STB11, and the fourth set of STB12-STB15 in FIG. 8). The physical layer circuit 103 uses two physical layer clocks (physical layer clock 2, and physical layer clock 3) to transfer the four consecutive sets (the total of 16 bits) of parallel STB data into a serial 16-bit command in eight cycles of the physical layer clock 3. And the serial 16-bit command is transmitted to the memory circuit 101 through the STB bus and STB 510 in FIG. 2.

Figure 9:
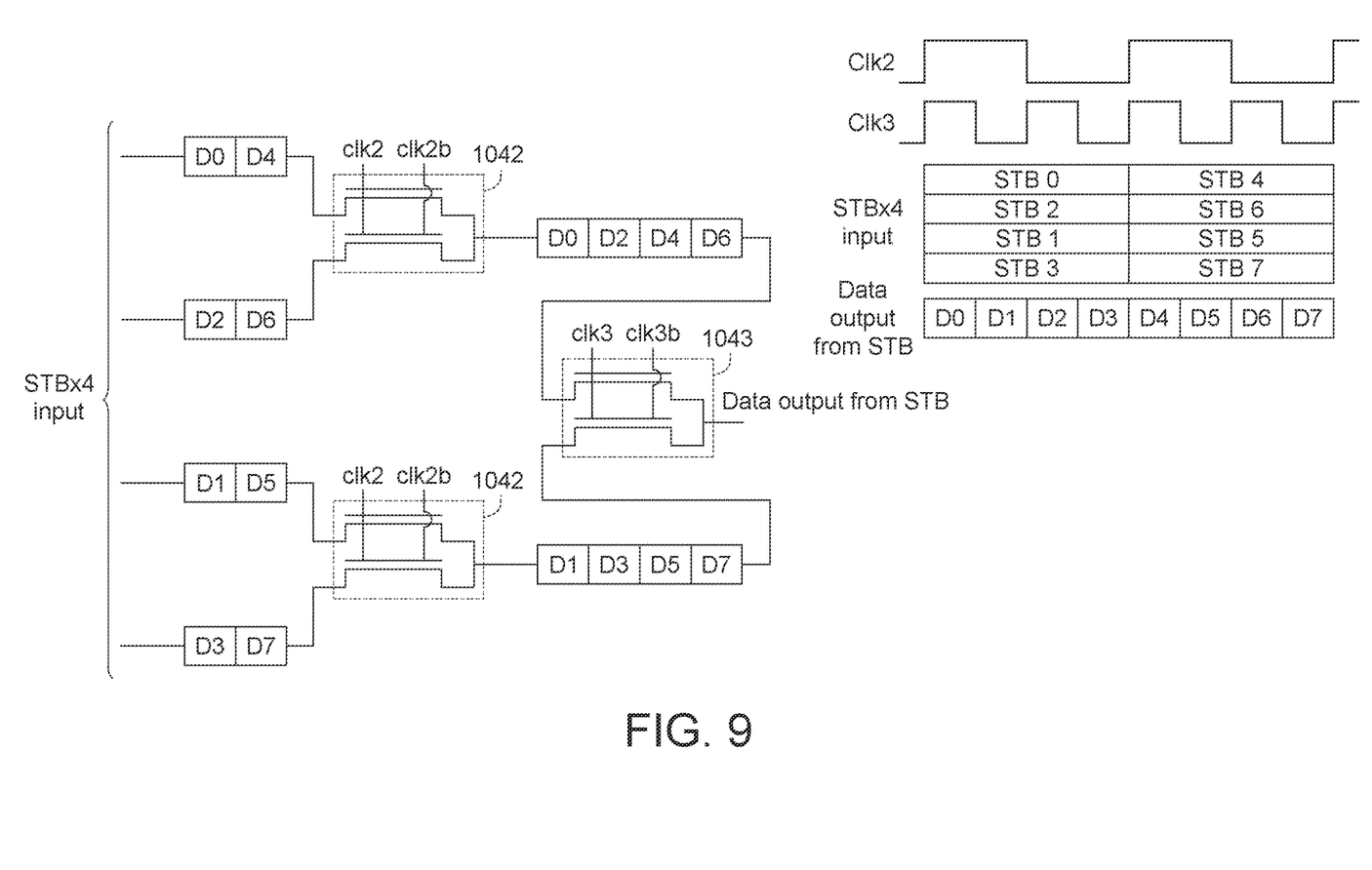
FIG. 9 is a diagram illustrating the adaptive conversion circuit 104 in the physical layer circuit 103 corresponding to the embodiment of FIG. 8.

FIG. 9 is a diagram illustrating the adaptive conversion circuit 104 corresponding to the embodiment of FIG. 8, wherein D0-D7=STB 0-STB7. The clock Clk3 corresponds to the physical layer clock 3, the clock Clk3b corresponds to the inverse signal of the physical layer clock 3, the clock Clk2 corresponds to the physical layer clock 2, and the clock Clk2b corresponds to the inverse signal of the physical layer clock 2. The period of the physical layer clock 2 is twice the period of physical layer clock 3. The adaptive conversion circuit 104 is a two-level circuits which includes two sets of second switch circuits 1042 and a set of third switch circuits 1043. In fact, FIG. 9 is the two-level circuits which includes two sets of second switch circuits 1042 and one set of third switch circuits 1043 shown in FIG. 7. The operation of the two sets of second switch circuits 1042 and one set of third switch circuits 1043 is as described above. Therefore, the detailed description is omitted. The adaptive conversion circuit 104 can convert a 4-bit parallel data STB0-3 to a serial 4-bit data STB0-3 in 2 cycles of the clock Clk3 (or 2 cycles of the physical layer clock 3) and transmit it to the STB bus and the STB 540 of the memory circuit 101, and so on. Therefore, in 8 cycles of the clock Clk3, the adaptive conversion circuit 104 can convert four consecutive sets of parallel data STB0-3, STB4-7, STB 8-11 and STB12-15 into one serial 16-bit data STB0-15.

Figure 10:
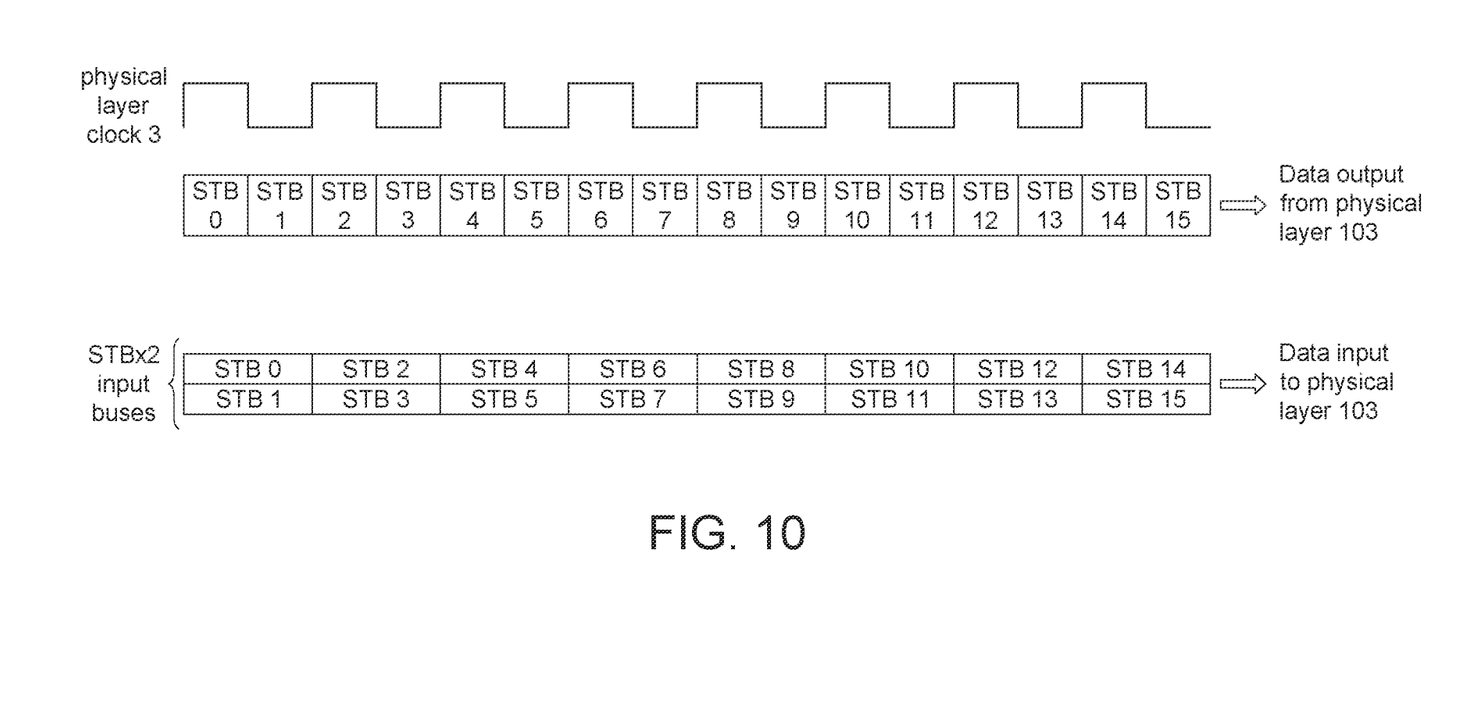
FIG. 10 is a diagram illustrating an embodiment of the present invention when the STB data width provided by controller IC 102 to physical layer circuit 103 is 2 bits.

Referring to FIG. 10, the STB data width provided by controller IC 102 to physical layer circuit 103 in another embodiment of the present invention is 2 bits, i.e. the STBxN input bus between them is the STBx2 input bus. This means that a set of 2-bit parallel STB data is provided by the controller IC 102 to physical layer circuit 103 at once time, but one serial read command provided by physical layer circuit 103 to memory circuit 101 contains 16 bits. Therefore, Therefore, the controller IC 102 will provide the physical layer circuit 103 with 8 consecutive sets (the total of 16 bits) of parallel STB data (i.e. the first set of STB0-STB1, the second set of STB2-STB3, the third set of STB4-STB5, the fourth set of STB6-STB7, the fifth set of STB8-STB9, the sixth set of STB10-STB11, the seventh set of STB12-STB13, the eighth set of STB14-STB15 in FIG. 10). The physical layer circuit 103 uses one physical layer clocks (physical layer clock 3) to transform or convert the 8 consecutive sets (total of 16 bits) of parallel STB data into a serial 16-bit command in eight cycles of the physical layer clock 3. And the serial 16-bit command is transmitted to the memory circuit 101 through the STB bus and STB 510 in FIG. 2.

Figure 11:
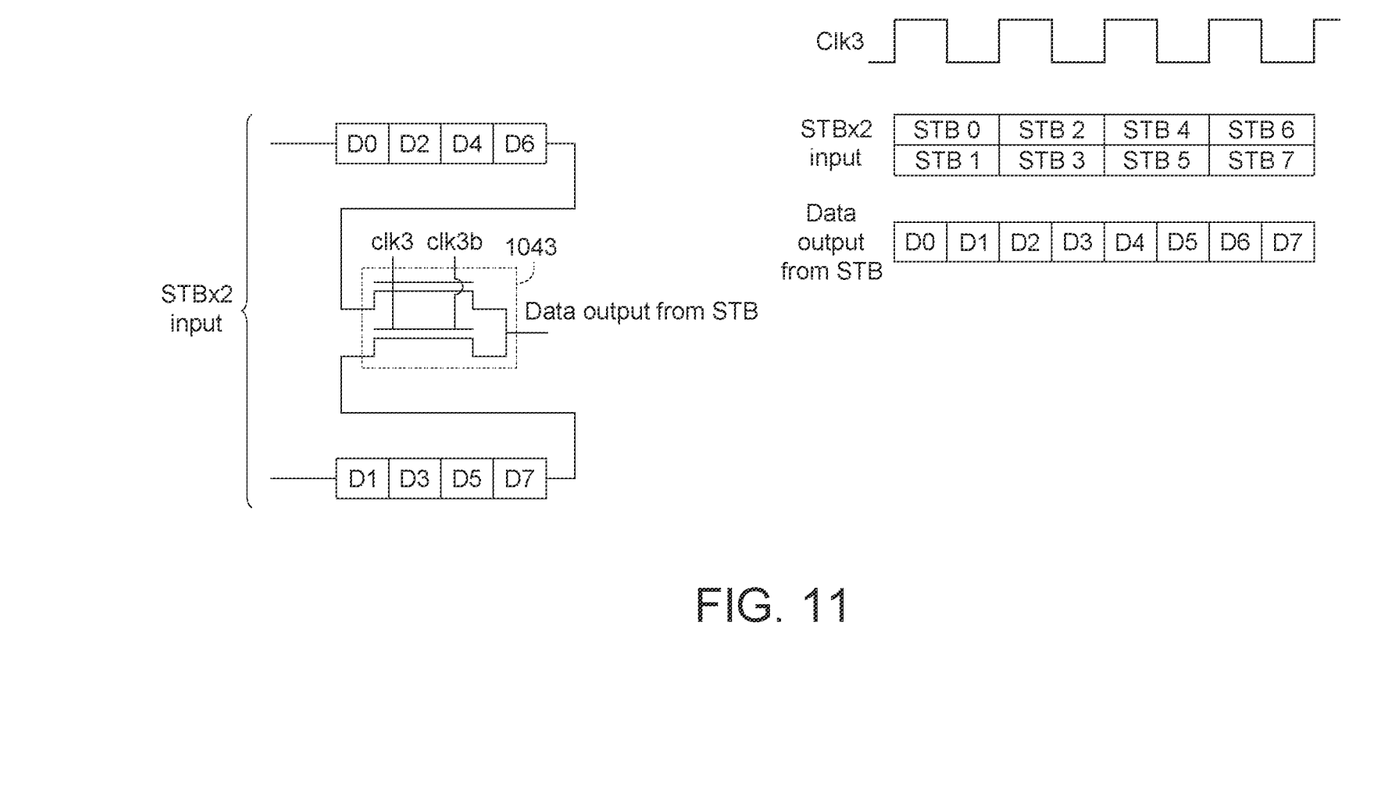
FIG. 11 is a diagram illustrating the adaptive conversion circuit 104 in the physical layer circuit 103 corresponding to the embodiment of FIG. 10.

FIG. 11 is a diagram illustrating the adaptive conversion circuit 104 in the physical layer circuit 103 corresponding to the embodiment of FIG. 10. As shown in FIG. 11, D0-D7=STB 0-STB7. The clock Clk3 corresponds to the physical layer clock 3, and the clock Clk3b corresponds to the inverse signal of the physical layer clock 3. The adaptive conversion circuit 104 includes one set of third switch circuits 1043 to receive the clock Clk3 and the clock Clk3b. In fact, FIG. 11 is one set third switch circuits 1043 shown in FIG. 7. The operation thereof is as described above, thus, the detailed description is omitted. The adaptive conversion circuit 104 can convert a 2-bit parallel data STB0-1 to a serial 2-bit serial data STB0-1 in 1 cycle of the clock Clk3 (or 1 cycle of the physical layer clock 3) and transmit it to the STB bus and the STB 540 of the memory circuit 101, and so on. Therefore, in 8 cycles of the clock Clk3, the adaptive conversion circuit 104 can convert 8 consecutive sets of parallel data STB0-1, STB2-3, STB 4-5, STB6-7, STB8-9, STB10-11, STB12-13 and STB14-15 into one serial 16-bit data STB0-15.

Figure 12:
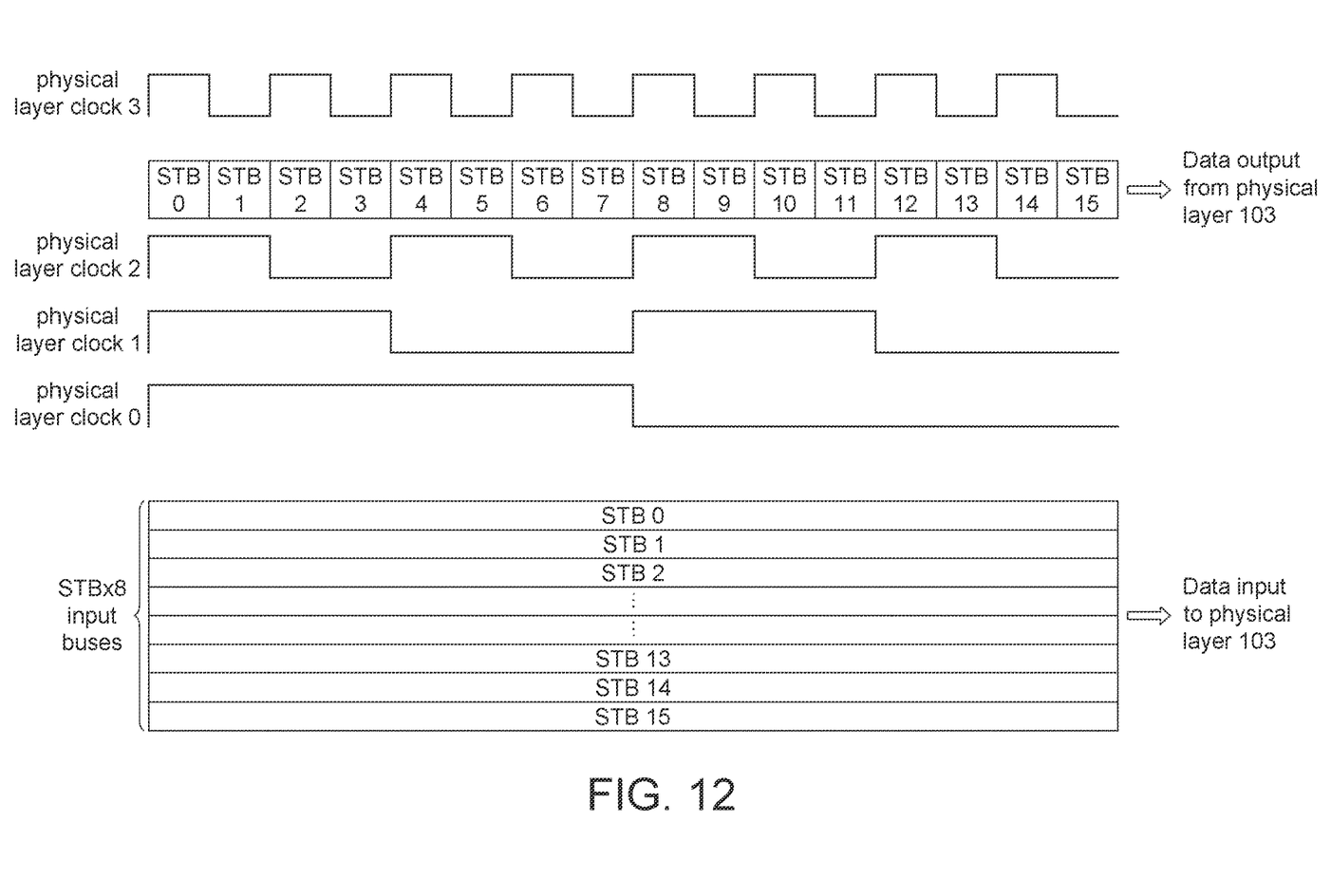
FIG. 12 is a diagram illustrating an embodiment of the present invention when the STB data width provided by controller IC 102 to physical layer circuit 103 is 16 bits.

Referring to FIG. 12, the STB data width provided by controller IC 102 to physical layer circuit 103 in another embodiment of the present invention is 16 bits, i.e. the STBxN input bus between them is the STBx16 input bus. This means that a set of 16-bit parallel STB data is provided by the controller IC 102 to physical layer circuit 103 at once time, and one serial read command provided by physical layer circuit 103 to memory circuit 101 contains 16 bits. Therefore, the controller IC 102 will provide the physical layer circuit 103 with one 16-bit parallel STB data (i.e. the first set of STB0-STB15 in FIG. 12). The physical layer circuit 103 uses four physical layer clocks (physical layer clock 1, physical layer clock 2, physical layer clock 3, and physical layer clock 0) to transform or convert one 16-bit parallel STB data into a serial 16-bit command in eight cycles of the physical layer clock 3. And the serial 16-bit command is transmitted to the memory circuit 101 through the STB bus and STB 510 in FIG. 2.

The period of the physical layer clock 2 is twice the period of physical layer clock 3, the period of the physical layer clock 1 is twice the period of physical layer clock 2, and the period of the physical layer clock 0 is twice the period of physical layer clock 1. The adaptive conversion circuit 104 corresponding to FIG. 12 is a four-level circuits which includes 8 sets of fourth switch circuits 1044, four sets of first switch circuits 1041, two sets of second switch circuits 1042, and one set of third switch circuits 1043. A clock Clk3 corresponds to the physical layer clock 3, a clock Clk3b corresponds to the inverse signal of the physical layer clock 3, a clock Clk2 corresponds to the physical layer clock 2, a clock Clk2b corresponds to the inverse signal of the physical layer clock 2, a clock Clk1 corresponds to the physical layer clock 1, a clock Clk1b corresponds to the inverse signal of the physical layer clock 1, a clock Clk0 corresponds to the physical layer clock 0, and a clock Clk0b corresponds to the inverse signal of the physical layer clock 0. The fourth switch circuits 1044 receives the clock Clk0 and the clock Clk0b, the first switch circuit 1041 receives the clock Clk1 and the clock Clk1b, the second switch circuit 1042 receives the clock Clk2 and the clock Clk2b, and the third switch circuit 1043 receives the clock Clk3 and the clock Clk3b. In fact, the adaptive conversion circuit 104 corresponding to FIG. 12 includes the adaptive conversion circuit 104 shown in FIG. 7 and 8 sets of fourth switch circuits 1044, wherein outputs of 8 sets of fourth switch circuits 1044 are configured to inputs of four sets of the first switch circuits 1041. The operation of the adaptive conversion circuit 104 corresponding to FIG. 12 is substantially the same as the adaptive conversion circuit 104 shown in FIG. 7 described above, thus, the detailed description is omitted.

In summary, the memory system disclosed in the present invention includes a memory, a controller IC, and a physical layer circuit. The memory contains a data bus. The data bus not only transfers general parallel data in parallel, but also provides address and control commands in parallel. Therefore, by multiplexing address and control information onto the data bus, a large number of memory pins can be eliminated, thereby enabling to save memory controller IC chip area, cost, and power. In addition, the memory contains a STB pin, and the physical layer circuit uses a serial protocol to provide address and control commands to the STB of the memory to improve the efficiency of the data bus. Since the STB is a single pin, the physical layer circuit uses an adaptive conversion circuit to convert the address and control commands from the controller IC (or different widths of STB input data) into serial data, which are sequentially received by the STB and then executed by the memory. Therefore, compared with the prior art, the memory system of the present invention not only reduces the bus width connected to the memory chip, but also increase the transmission rate and number of signals by transmitting command signals/address signals in parallel protocol and serial protocol between the controller IC and the memory chip at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory system comprising:
a controller;
a memory comprising a data bus configured to receive a parallel command, and a serial bus configured to receive a serial command; and
a physical layer circuit configured to transmit the parallel command to the data bus, the physical layer circuit coupled between the memory and the controller;
wherein the physical layer circuit is configured to convert an input parallel strobe (STB) data into the serial command and transmit the serial command to the serial bus; and the physical layer circuit includes at-least-one-level switch circuit for converting the input parallel strobe (STB) data into the serial command, and the serial bus is a single strobe pin.

2. The memory system of claim 1, wherein the memory has less than 45 signal pins, the data bus has 16 signal pins, the parallel command is 16 bit wide and the serial command is 16 bit long, command signals from the controller are converted by the physical layer circuit into a transmission format conforming to the serial bus and the data bus of the memory, and the converted command signals are transmitted to the memory for execution.

3. The memory system of claim 1, wherein the memory receives both the parallel command and the serial command.

4. The memory system of claim 1, wherein the parallel command comprises a first command signal and a first address signal, and the serial command comprises a second command signal and a second address signal; wherein, based on the parallel command received from the data bus, the memory outputs a first data corresponding to the first address signal from the data bus after a first predetermined time; wherein, based on the serial command received from the serial bus, the memory outputs a second data corresponding to the second address signal from the data bus after as a second predetermined time.

5. The memory system of claim 1, wherein the physical layer circuit comprises an adaptive conversion circuit and a set of clock signals, wherein the adaptive conversion circuit converts the input parallel strobe (STB) data into the serial command based on the set of clock signals and the serial command is 16-bit long.

6. The memory system of claim 5, wherein the controller providing the input parallel strobe (STB) data to the physical layer circuit, wherein the input parallel strobe (STB) data is one set of 16-bit wide parallel data, two sets of 8-bit wide parallel data, 4 sets of 4-bit wide parallel data, or 8 sets of 2-bit wide parallel data, wherein the memory comprises a clock signal, and the adaptive conversion circuit converts the one set of 16-bit wide parallel data, two sets of 8-bit wide parallel data, 4 sets of 4-bit wide parallel data, or 8 sets of 2-bit wide parallel data into the 16-bit long serial command.

7. The memory system of claim 1, wherein the physical layer circuit transmits the parallel command to the data bus which is a 16-bit wide DQ bus and the physical layer circuit transmits the serial command to the serial bus which is a 1-bit wide STB bus.

8. The memory system of claim 7, wherein the 16-bit wide DQ bus is separated from the 1-bit wide STB bus.

9. A memory system comprising:
a memory comprising a data bus configured to receive a parallel command, and a serial bus configured to receive a serial command; and
a physical layer circuit configured to transmit the parallel command to the data bus;
wherein the physical layer circuit is configured to convert an input data into the serial command and transmit the serial command to the serial bus;
wherein the physical layer circuit comprises an adaptive conversion circuit and a set of clock signals; the adaptive conversion circuit converts the input data into the serial command based on the set of clock signals; and the serial command is 16-bit long; and wherein the input data comprises two sets of 8-bit wide parallel data, and the set of clock signals comprises a clock 1 signal, a clock 2 signal and a clock 3 signal; wherein the period of the clock 2 signal is twice the period of the clock 3 signal, and the period of the clock 1 signal is twice the period of the clock 2 signal; wherein the adaptive conversion circuit converts the two sets of 8-bit wide parallel data into the 16-bit long serial command based on the clock 1 signal, the clock 2 signal and the clock 3 signal in 8 cycles of the clock 3 signal.

10. A memory system comprising:

a memory comprising a data bus configured to receive a parallel command, and a serial bus configured to receive a serial command; and a physical layer circuit configured to transmit the parallel command to the data bus;

wherein the physical layer circuit is configured to convert an input data into the serial command and transmit the serial command to the serial bus;

wherein the physical layer circuit comprises an adaptive conversion circuit and a set of clock signals; the adaptive conversion circuit converts the input data into the serial command based on the set of clock signals and the serial command is 16-bit long; and wherein the input data comprises 4 sets of 4-bit wide parallel data, and the set of clock signals comprises a clock 2 signal and a clock 3 signal; wherein the period of the clock 2 signal is twice the period of the clock 3 signal; wherein the adaptive conversion circuit converts the 4 sets of 4-bit wide parallel data into the 16-bit long serial command based on the clock 2 signal and the clock 3 signal in 8 cycles of the clock 3 signal.

11. A memory system comprising:

a memory comprising a data bus configured to receive a parallel command, and a serial bus configured to receive a serial command; and a physical layer circuit configured to transmit the parallel command to the data bus;

wherein the physical layer circuit is configured to convert an input data into the serial command and transmit the serial command to the serial bus;

wherein the physical layer circuit comprises an adaptive conversion circuit and a set of clock signals; the adaptive conversion circuit converts the input data into the serial command based on the set of clock signals; and the serial command is 16-bit long; and wherein the input data comprises 8 sets of 2-bit wide parallel data, and the set of clock signals comprises a clock 3 signal; wherein the adaptive conversion circuit converts the 8 sets of 2-bit wide parallel data into the 16-bit long serial command based on the clock 3 signal in 8 cycles of the clock 3 signal.

12. A memory system comprising:

a memory comprising a data bus configured to receive a parallel command, and a serial bus configured to receive a serial command; and a physical layer circuit configured to transmit the parallel command to the data bus;

wherein the physical layer circuit is configured to convert an input data into the serial command and transmit the serial command to the serial bus;

wherein the physical layer circuit comprises an adaptive conversion circuit and a set of clock signals; the adaptive conversion circuit converts the input data into the serial command based on the set of clock signals; and the serial command is 16-bit long; and wherein the input data comprises one set of 16-bit wide parallel data, and the set of clock signals comprises a clock 0 signal, a clock 1 signal, a clock 2 signal and a clock 3 signal;

wherein the period of the clock 2 signal is twice the period of the clock 3 signal, the period of the clock 1 signal is twice the period of the clock 2 signal, and the period of the clock 0 signal is twice the period of the clock 1 signal; wherein the adaptive conversion circuit converts the one set of 16-bit wide parallel data into the 16-bit long serial command based on the clock 0 signal, the clock 1 signal, the clock 2 signal and the clock 3 signal in 8 cycles of the clock 3 signal.

* * * * *